US012192708B2

(12) United States Patent
Rekimto

(10) Patent No.: US 12,192,708 B2
(45) Date of Patent: Jan. 7, 2025

(54) BONE CONDUCTION ACOUSTIC TRANSMISSION DEVICE

(71) Applicant: SONY CORPORATION, Tokyo (JP)

(72) Inventor: Junichi Rekimto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1177 days.

(21) Appl. No.: 16/641,502

(22) PCT Filed: Jun. 20, 2018

(86) PCT No.: PCT/JP2018/023399
§ 371 (c)(1),
(2) Date: Mar. 23, 2021

(87) PCT Pub. No.: WO2019/053990
PCT Pub. Date: Mar. 21, 2019

(65) Prior Publication Data
US 2021/0219079 A1 Jul. 15, 2021

(30) Foreign Application Priority Data
Sep. 13, 2017 (JP) ................................ 2017-175829

(51) Int. Cl.
*H04R 25/00* (2006.01)
*H04R 1/10* (2006.01)
*H04R 11/02* (2006.01)

(52) U.S. Cl.
CPC ......... *H04R 25/606* (2013.01); *H04R 1/1041* (2013.01); *H04R 1/1075* (2013.01); *H04R 11/02* (2013.01); *H04R 2460/13* (2013.01)

(58) Field of Classification Search
CPC .. H04R 25/60; H04R 25/606; H04R 2460/13; H04R 11/02; H04R 1/1041; H04R 1/1075
See application file for complete search history.

(56) References Cited

U.S. PATENT DOCUMENTS

2007/0280491 A1 12/2007 Abolfathi
2013/0110198 A1 5/2013 Stoffaneller
(Continued)

FOREIGN PATENT DOCUMENTS

CN 103124393 A 5/2013
CN 108028997 A1 5/2018
(Continued)

OTHER PUBLICATIONS

International Search Report and Written Opinion of PCT Application No. PCT/JP2018/023399, issued on Sep. 11, 2018, 12 pages of ISRWO.

(Continued)

*Primary Examiner* — Samuel G Gilbert
(74) *Attorney, Agent, or Firm* — CHIP LAW GROUP

(57) ABSTRACT

A bone conduction acoustic transmission device according to the present invention is provided with a first magnetic body to be placed in contact with or to be embedded in the head of a living body beforehand, and a coil unit provided separately from the first magnetic body. The coil unit has a coil configured using a predetermined casing that can be mounted on the first magnetic body and a second magnetic body which is provided in a predetermined position of the casing and does not vibrate due to the coil, and the first magnetic body vibrates as a result of applying an acoustic signal to the coil with the coil unit mounted on the head.

10 Claims, 12 Drawing Sheets

(56) References Cited

U.S. PATENT DOCUMENTS

| | | | | |
|---|---|---|---|---|
| 2015/0374964 | A1 | 12/2015 | Verhoeven | |
| 2016/0037273 | A1 | 2/2016 | Gustafsson | |
| 2017/0086002 | A1 * | 3/2017 | Nagl .................... | H04R 25/554 |
| 2017/0156010 | A1 * | 6/2017 | Verma ................ | A61N 1/36038 |

FOREIGN PATENT DOCUMENTS

| | | | |
|---|---|---|---|
| EP | 2030477 | A2 | 3/2009 |
| JP | 2007-184722 | A | 7/2007 |
| JP | 2007-251643 | A | 9/2007 |
| JP | 2009526612 | A | 7/2009 |
| JP | 2009-538714 | A | 11/2009 |
| JP | 2016-134785 | A | 7/2016 |
| WO | 2007/140373 | A2 | 12/2007 |
| WO | 2017/049022 | A1 | 3/2017 |

OTHER PUBLICATIONS

Office Action for JP Patent Application No. 2019-541660, issued on Jul. 5, 2022, 04 pages of English Translation and 04 pages of Office Action.

* cited by examiner

BONE CONDUCTION ACOUSTIC TRANSMISSION DEVICE

CROSS REFERENCE TO RELATED APPLICATIONS

This application is a U.S. National Phase of International Patent Application No. PCT/JP2018/023399 filed on Jun. 20, 2018, which claims priority benefit of Japanese Patent Application No. JP 2017-175829 filed in the Japan Patent Office on Sep. 13, 2017. Each of the above-referenced applications is hereby incorporated herein by reference in its entirety.

FIELD

The present invention relates to a bone conduction acoustic transmission device.

BACKGROUND

Conventionally, devices known as bone conduction speakers or bone conduction headphones, which transmit sound by causing vibrations of the inner ear via bone conduction without passing via the eardrum, have been proposed. These kinds of acoustic transmission devices using bone conduction are used in particular in cases where there is a need to transmit sound above noise and in cases where plugging the ears is undesirable in the interest of safety such as while running, for example. Furthermore, in recent years, wireless headphones have become popularized and the possibility of earphones being used not only for listening to music but also as an interface with a computer (for example, open-type earphones or the like used as a wearable-type interface) is also attracting attention.

As a bone conduction-type acoustic transmission device of this kind, a bone conduction hearing aid and a bone conduction speaker which have a vibrating member that causes the skull to vibrate and which enable sound to be transmitted via bone conduction by bringing the vibrating member into contact with the head are disclosed in Patent Literature 1 below, for example.

CITATION LIST

Patent Literature

Patent Literature 1: Japanese Laid-open Patent Publication No. 2007-184722.

SUMMARY

Technical Problem

However, in the bone conduction-type acoustic transmission device disclosed in the foregoing Patent Literature 1, the vibrating member causing the skull to vibrate in an environment where an acoustic signal is applied emits a continuous sound, and hence sound that should be transmitted only to the user is likely to leak to the external environment.

Therefore, according to the present invention, in view of the foregoing issue, a bone conduction acoustic transmission device capable of more reliably suppressing sound leakage to the external environment is proposed.

Solution to Problem

According to the present disclosure, a bone conduction acoustic transmission device is provided that includes: a first magnetic body placed in contact with or embedded in the head of a living body beforehand; and a coil unit provided separately from the first magnetic body, wherein the coil unit has a coil configured using a predetermined casing that can be mounted on the first magnetic body and a second magnetic body which is provided in a predetermined position of the casing and does not vibrate due to the coil, and wherein the first magnetic body vibrates as a result of applying an acoustic signal to the coil with the coil unit mounted on the head.

According to the present invention, a first magnetic body for transmitting vibrations to the skull is provided beforehand on the head of a living body and separate from a coil unit, and the first magnetic body vibrates as a result of applying an acoustic signal to a coil with the coil unit mounted on the head.

Advantageous Effects of Invention

According to the present invention as described hereinabove, it is possible to more reliably suppress sound leakage to the external environment.

Note that the foregoing advantageous effects are not necessarily limited, rather, any advantageous effects disclosed in the present specification or other advantageous effects which can be ascertained from the present specification may be included in addition to the foregoing advantageous effects or instead of the foregoing advantageous effects.

DESCRIPTION OF EMBODIMENTS

Figure 1:
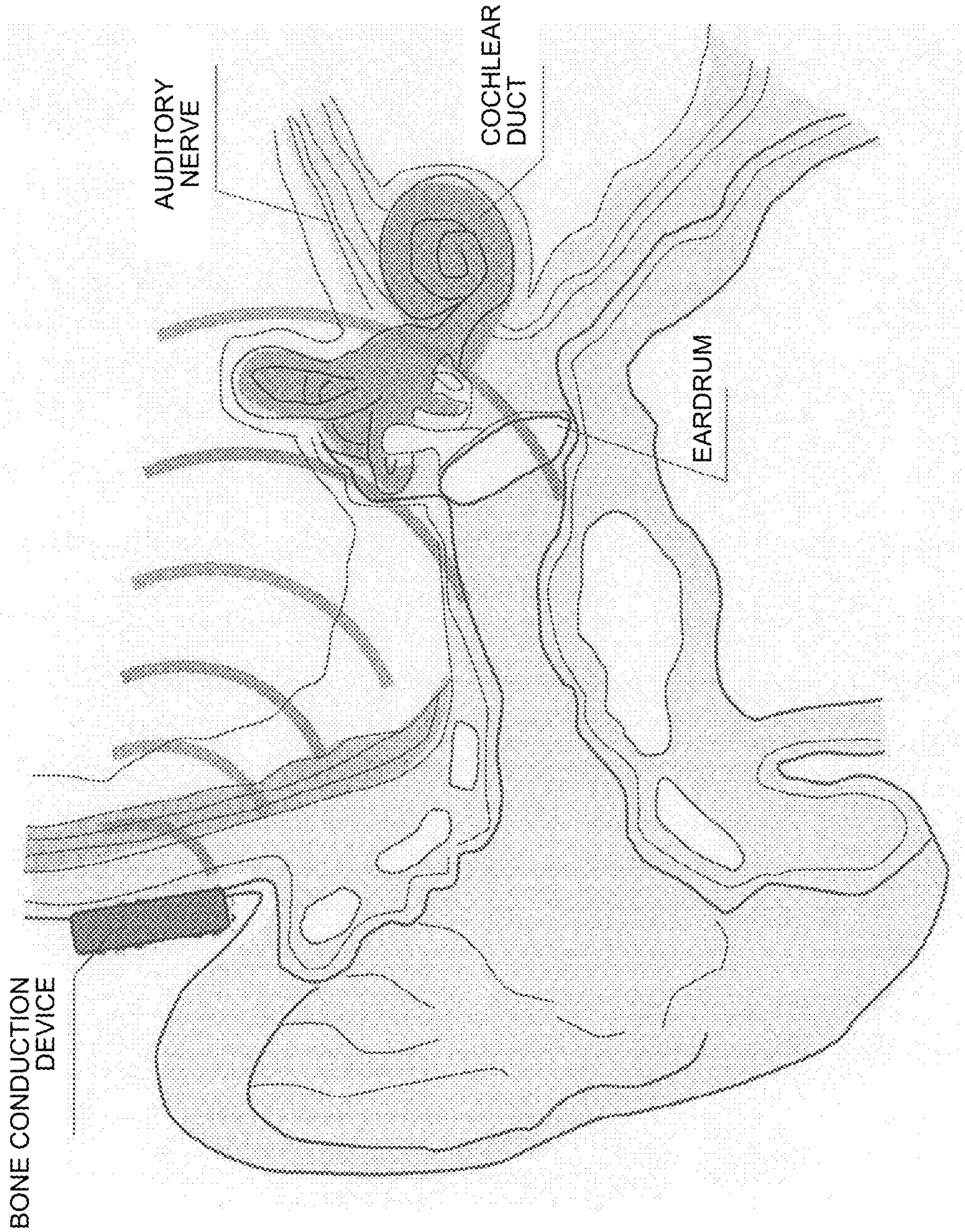
FIG. 1 is an explanatory diagram describing an overview of a mechanism for sound transmission by a bone conduction device.

Preferred embodiments of the present invention will be explained in detail hereinbelow with reference to the accompanying drawings. Note that repetitive descriptions are omitted from the present specification and drawings by assigning the same reference signs to constituent elements which have substantially the same function configurations.

Note that the description will be provided in the following order.

1. Overview of bone conduction device
2. Configuration of bone conduction acoustic transmission system 1
3. Configuration of bone conduction acoustic transmission device 10
4. Flow of operation of bone conduction acoustic transmission device 10
5. Operation example
6. Modification examples
7. Applied examples

1. Overview of Bone Conduction Device

Figure 2:
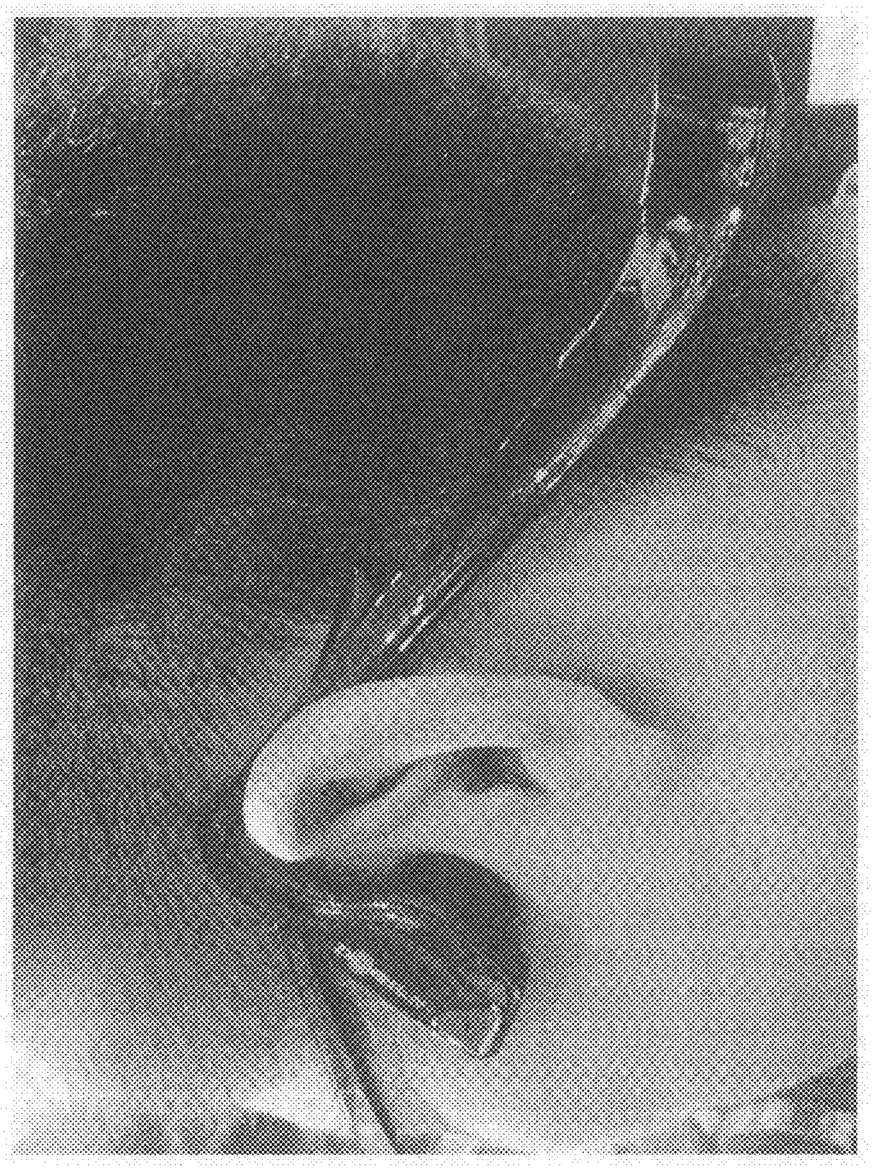
FIG. 2 is an explanatory diagram illustrating an example of an aspect in which the bone conduction device is mounted.

First, a general bone conduction device will be described in simple terms with reference to FIGS. 1 and 2. FIG. 1 is an overview describing sound transmission by a bone conduction device. FIG. 2 is an explanatory diagram illustrating an example of an aspect in which a bone conduction device is mounted.

The vibrations generated by a bone conduction device according to an acoustic signal are transmitted to the cochlear duct of the inner ear by causing the skull to vibrate without passing via the eardrum. The vibration of the cochlear duct is sensed by the auditory nerve, and, as a result of the brain recognizing the vibrations, the user is able to recognize the sounds corresponding to the acoustic signal. To achieve favorable acoustic transmission by using a bone conduction device, it is important that the vibrations generated by the bone conduction device are suitably transmitted to the skull, and hence the bone conduction device must be placed in close contact with the surface of the head. As illustrated in FIG. 2, because the bone conduction device causes the skull to vibrate by placing a piezoelectric transducer in contact with the temple and so forth, a headset-type structure that performs retention by applying pressure from the left and right sides so as to hold the temples therebetween is typical. The bone conduction device is used in cases where sound information such as music is to be captured without plugging the ears to enable the user to recognize sounds in the environment, and is utilized as an assistive device in cases where hearing has been lost due to damage to the external ear, middle ear, or the like. However, this kind of bone conduction device applies compression to the parts of the user where the device is mounted, long-term use may not be comfortable, and usage is often conspicuous from the standpoint of appearance. In addition, the bone conduction device itself, which is brought into contact with the head, vibrates and hence external sound leakage is likely to occur.

2. General Configuration of Bone Conduction Acoustic Transmission System 1

(Bone Conduction Acoustic Transmission System 1)

Figure 3:
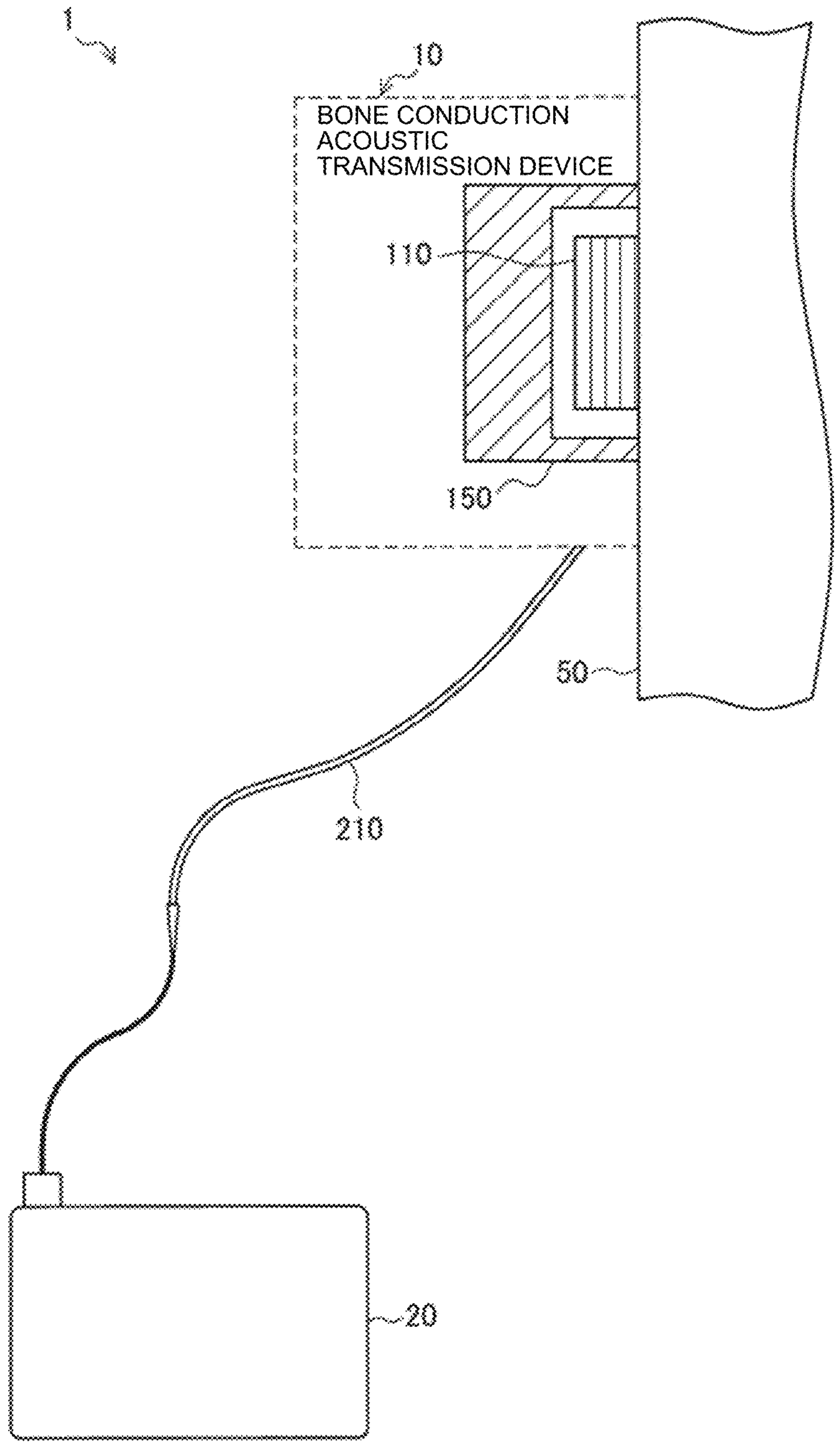
FIG. 3 is an explanatory diagram illustrating an example of a configuration of a bone conduction acoustic transmission system 1 according to an embodiment of the present invention.

A general configuration of a bone conduction acoustic transmission system 1 according to an embodiment of the present invention will be described next with reference to FIG. 3. FIG. 3 is an explanatory diagram illustrating an example of a configuration of a bone conduction acoustic transmission system 1 according to the present embodiment.

The bone conduction acoustic transmission system 1 according to the present embodiment comprises a bone conduction acoustic transmission device 10 and an acoustic signal output unit 20. The bone conduction acoustic transmission system 1 has a function for transmitting sound by converting an acoustic signal that has been output by the acoustic signal output unit 20 to vibration by means of the bone conduction acoustic transmission device 10 and causing the inner ear to vibrate via bone conduction.

(Bone Conduction Acoustic Transmission Device 10)

The bone conduction acoustic transmission device 10 has a function for converting an acoustic signal to vibration and causing the skull to vibrate. The bone conduction acoustic transmission device 10 comprises a first magnetic body 110 and a coil unit 150. An acoustic signal that has been output by the acoustic signal output unit 20 is applied to the coil unit 150 via a connecting portion 210. A magnetic field in the vicinity of the bone conduction acoustic transmission device 10 is varied by means of the coil unit 150 in response to the applied acoustic signal, and the first magnetic body 110 vibrates according to these variations in the magnetic field. Further, sound is transmitted as a result of the vibration of the first magnetic body 110 being transmitted to the inner ear via the skull.

In addition, the bone conduction acoustic transmission device 10 may, according to requirements, have at least any of a storage unit that stores acoustic data constituting an acoustic signal source, a communication unit capable of mutual communication with the acoustic signal output unit 20, and a power supply unit enabling the operation of the bone conduction acoustic transmission device 10, and the like.

The first magnetic body 110 is placed in contact with or embedded in a head 50 of a living body beforehand. Any magnetic body may be used as the first magnetic body 110 as long as same has a predetermined magnetic force. Possible examples of magnetic bodies include, for example, a ferrite magnet, an alnico magnet, rare-earth magnets such as a samarium-cobalt magnet or a neodymium magnet, a ferrite bonded magnet, a rare-earth bonding magnet, and an alnico bonded magnet. A neodymium magnet has a large magnetic force, and is preferable from the standpoint of further miniaturizing the first magnetic body 110.

The coil unit 150 is separate from the first magnetic body 110 and is mounted on the head 50 when in use. The detailed structure of the coil unit 150 is described once again hereinbelow.

(Acoustic Signal Output Unit 20)

The acoustic signal output unit 20 has a function for outputting an acoustic signal, for example. In addition, the acoustic signal output unit 20 may, according to requirements, have at least any of a storage unit that stores acoustic data constituting an acoustic signal source, a communication unit capable of mutual communication with another device or the bone conduction acoustic transmission device 10, and a power supply unit, and the like. As long as an acoustic signal can be output to the bone conduction acoustic transmission device 10, devices that may be used as the acoustic signal output unit 20 include, for example, mobile terminals such as smartphones, tablet-type terminals, and notebook computers, acoustic devices such as audio players and portable music players, and viewing devices such as televisions, DVD players, and Blu-ray players. In addition, an acoustic signal that is output by the acoustic signal output unit 20 may have its data converted using a method corresponding to the device functioning as the acoustic signal output unit 20, and may have its saved data format converted according to a storage medium such as a hard disk, memory card, or optical disk that can be mounted in and used by the acoustic signal output unit 20. Furthermore, data that is saved on another storage medium or in the cloud via the internet may also be converted to an acoustic signal.

The connecting portion 210 has a function for transmitting an acoustic signal to the bone conduction acoustic transmission device 10. As long as an acoustic signal can be transmitted to the bone conduction acoustic transmission device 10, the connecting portion 210 may connect a connecting terminal (not illustrated) provided on the bone conduction acoustic transmission device 10 to the acoustic signal output unit 20 by means of a cable as illustrated in FIG. 3. The connecting portion 210 may also transmit an acoustic signal to the bone conduction acoustic transmission device 10 by means of wireless communications such as WLAN (Wireless Local Area Network), Bluetooth (registered trademark), or WUSB (Wireless USB), for example. This communication network for wireless communications may, for example, be the internet, or an infrared-communication, radio-wave communication or satellite-communication network.

3. Configuration of Bone Conduction Acoustic Transmission Device 10

Figure 4:
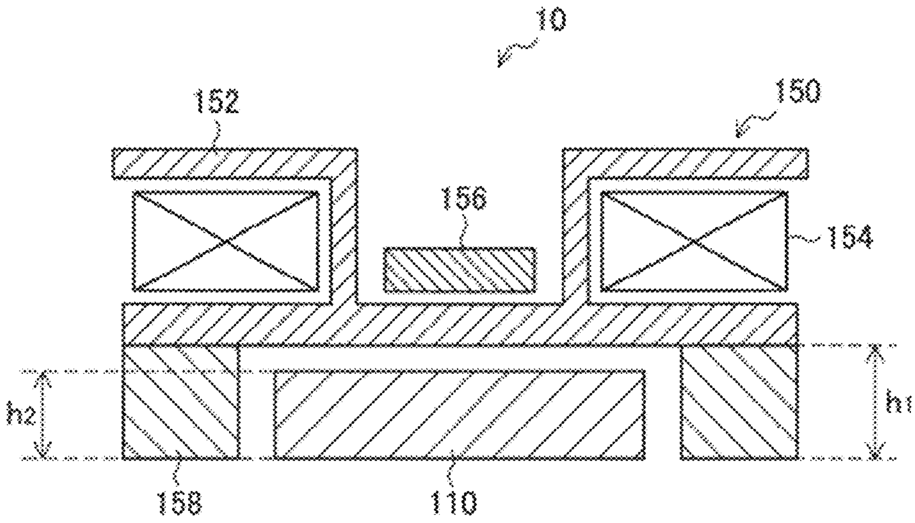
FIG. 4 is a cross-sectional view illustrating an example of a configuration of a bone conduction acoustic transmission device 10 according to the embodiment.

An example of the configuration of the bone conduction acoustic transmission device 10 according to a first embodiment of the present invention will be described next with reference to FIG. 4. FIG. 4 is a diagram that illustrates a case where the first magnetic body 110 is placed in contact with the head 50, and illustrates a cross section when the bone conduction acoustic transmission device 10 has been cut perpendicularly to the surface of the first magnetic body 110 in contact with the head 50. As illustrated in FIG. 4, the coil unit 150 comprises a casing 152, a coil 154, a second magnetic body 156, and a vibration damping member 158.

(Casing 152)

The casing 152 serves to accommodate, in predetermined positions, the coil 154 and the second magnetic body 156. In FIG. 4, the casing 152 has a plurality of recesses, and the coil 154 and the second magnetic body 156 are arranged in the plurality of recesses, respectively. However, the casing 152 need not necessarily be shaped in this way and may be of any shape, as long as the coil 154 and the second magnetic body 156 can be accommodated therein. For example, the casing 152 may encapsulate the coil 154 and second magnetic body 156, respectively, such that same are sealed. The material of the casing 152 is preferably a material with insulating properties, of which specific examples include polyamides, polybutylene terephthalate, polysulfones, polyimides, poly(ether imides), and poly(ether sulfones), and the like.

The coil 154 has an acoustic signal applied thereto by the acoustic signal output unit 20, and causes the first magnetic body 110 to vibrate at a frequency that corresponds to the acoustic signal. The coil 154 is realized by winding, around the casing 152, a material that transmits the acoustic signal. The material used for the coil 154 is preferably a material that transmits the acoustic signal with minimal loss, such as enamel copper wire or similar, for example. The number of windings of the coil 154 is preferably adjusted to establish an impedance match with the acoustic signal output unit 20.

The second magnetic body 156 has a function for mounting the coil unit 150 on the head 50. The second magnetic body 156 does not vibrate as a result of the coil 154. Hence, the second magnetic body 156 may, for example, be fixed to the coil unit 150, and the material used for the second magnetic body 156 may be a material that does not vibrate when there is a variation in the magnetic field generated by the coil 154. As a result of magnetic interaction between the first magnetic body 110 and second magnetic body 156, the positional relationship between the first magnetic body 110 and coil unit 150 is fixed. In specific terms, the coil unit 150 is mounted on the head 50 as a result of the magnetic force generated between the first magnetic body 110 and second magnetic body 156. The material of the second magnetic body 156 may be a ferromagnetic body, and more specifically, a permanent magnet such as a ferrite magnet, an alnico magnet, a rare-earth magnet such as a samarium-cobalt magnet or a neodymium magnet, a ferrite bonded magnet, a rare-earth bonding magnet, or an alnico bonded magnet may be used, or an alloy such as martensitic stainless steel or ferritic stainless steel, or a metal such as iron, nickel or cobalt may be used as the so-called iron core. The second magnetic body 156 may be positioned such that the coil unit 150 is mounted as a result of the magnetic force generated between the second magnetic body 156 and the first magnetic body 110, or may be provided in a position inside the magnetic field of the first magnetic body 110 when the coil unit 150 is mounted on the head 50. Note that the second magnetic body 156 is an iron core, and when positioned inside the coil 154, an effect is produced whereby the magnetic field generated by the coil unit 150 becomes large, in addition to the effect of fixing the coil unit 150 to the head 50.

The vibration damping member 158 has a function for suppressing the vibrations of the coil unit 150. The vibration damping member 158 is provided so as to protrude toward the head 50 from the surface of the casing 152 on the side opposite the head 50 when the bone conduction acoustic transmission device 10 is mounted, and so as to enclose the sides of the first magnetic body 110. In addition, a height h1 of the vibration damping member 158 is preferably higher than a height h2 of the first magnetic body 110 from the casing 152, that is, h1>h2 is preferably established. Furthermore, (h1−h2), which is the difference between the height h1 of the vibration damping member 158 and the height of the first magnetic body 110, is preferably configured suitably according to the range of movement caused by the vibrations of the first magnetic body 110, to ensure that, while vibrating, the first magnetic body 110 does not make contact with the coil unit 150. As a result of such a structure, in which a gap is present between the first magnetic body 110 and the coil unit 150, during operation of the bone conduction acoustic transmission device 10, the first magnetic body 110 transmits sound to the inner ear by vibrating, while the vibrations of the coil unit 150 are diminished and a high degree of external quietness is obtained. The material of the vibration damping member 158 may suppress the vibrations of the coil unit 150, and may be any material such as natural rubber, polyurethane, butyl rubber, or silicone rubber, for example. From the perspective of adhesion, silicone rubber is preferably used as the material of the vibration damping member 158.

As mentioned earlier, in the bone conduction acoustic transmission device 10, the first magnetic body 110, which transmits vibrations to the skull, is fixed to the scalp beforehand. Because the coil unit 150 is mounted as a result of the second magnetic body 156 acting magnetically with the first magnetic body 110, vibrations are also transmitted due to the slight displacement of the coil unit 150. In addition, the variations in sound information arising from changes in the position of the coil unit 150 are small in comparison with those of the bone conduction device in which the piezoelectric transducer itself vibrates. Moreover, by suppressing the vibrations of the coil unit 150, external sound leakage can be curbed.

The configuration of the bone conduction acoustic transmission device 10 has been described in detail thus far. Next, the flow of operation of the bone conduction acoustic transmission device 10 will be described.

4. Flow of Operation of Bone Conduction Acoustic Transmission Device 10

Figure 5:
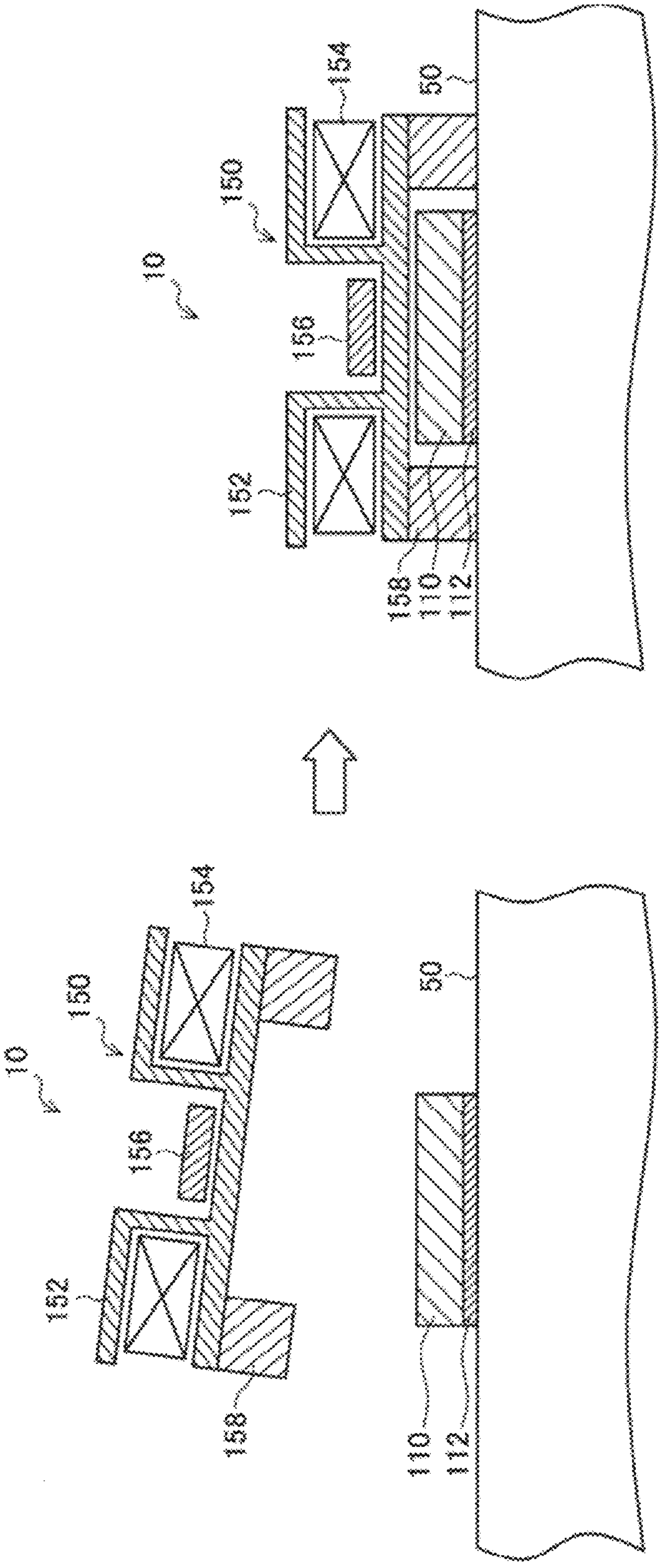
FIG. 5 is an explanatory diagram illustrating an example of aspects before and after mounting the bone conduction acoustic transmission device 10 according to the embodiment.

FIG. 5 is an explanatory diagram illustrating an example of aspects before and after mounting the bone conduction acoustic transmission device 10 according to the embodiment, which is an example in which the bone conduction acoustic transmission device 10 is used by placing the first magnetic body 110 in contact with the head 50 of the living body. FIG. 5 is a diagram that illustrates a case where the first magnetic body 110 is placed in contact with the head 50, and, similarly to FIG. 4, illustrates a cross section when the bone conduction acoustic transmission device 10 has been cut perpendicularly to the surface of the first magnetic body 110 in contact with the head 50.

As illustrated on the left side of FIG. 5, the bone conduction acoustic transmission device 10 prior to usage is in a state where the first magnetic body 110 and the coil unit 150 are separate. At such time, the first magnetic body 110 is placed in contact with the head 50 beforehand. There are no particular limitations on the method whereby the first magnetic body 110 is placed in contact with the head 50 as long as the method enables the first magnetic body 110 to be placed in contact with the head 50 detachably via a material capable of adhering to the skin. For example, in order to mount the first magnetic body 110 on the head 50, an adhesive body such as an adhesive tape provided so as to cover the first magnetic body 110 may be used to fix the first magnetic body 110 to the scalp, or a binder or the like may be used. At such time, the contact surface, which is the surface of the first magnetic body 110 in contact with the head 50, may be coated with a material 112 to prevent a burden being placed on the skin. In addition, the first magnetic body 110 may be machined to ensure breathability for the skin of the head 50. For example, a plurality of holes penetrating the first magnetic body 110 may be provided, or the contact surface may be made uneven through machining. By coating the contact surface with a material that has a minimal effect on the living body and machining the first magnetic body 110, it is possible to reduce the burden on the living body such as skin roughness.

As illustrated on the right side of FIG. 5, the coil unit 150 is placed in contact with the head 50 when the bone conduction acoustic transmission device 10 is used. At such time, because the second magnetic body 156 acts magnetically with the first magnetic body 110, the positional relationship between the first magnetic body 110 and the coil unit 150 is fixed. In specific terms, the second magnetic body 156 is mounted on the head 50 by being positioned inside the magnetic field of the first magnetic body 110.

As a result of an acoustic signal being applied to the bone conduction acoustic transmission device 10, mounted in this manner, by the acoustic signal output unit 20 via the connecting portion 210, sound is transmitted as a result of the first magnetic body 110 vibrating, the vibrations of the first magnetic body 110 being transmitted to the inner ear, and the inner ear vibrating in response to the acoustic signal. At such time, because the vibrations of the coil unit 150 are reduced by the vibration damping member 158, sound leakage to the external environment can be more reliably suppressed.

5. Operation Example

An operating example of the bone conduction acoustic transmission device 10 according to the present embodiment will be described next.

(Mounting Position)

Figure 6:
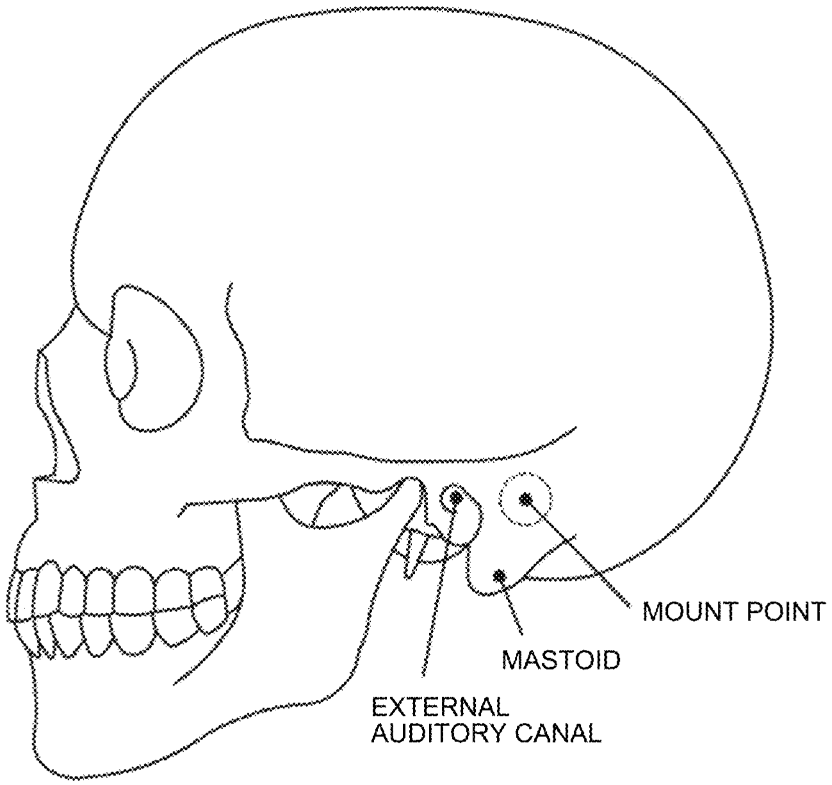
FIG. 6 is an explanatory diagram serving to illustrate an example of a position for mounting the bone conduction acoustic transmission device 10 according to the embodiment.

First, the mounting position of the bone conduction acoustic transmission device 10 will be described. FIG. 6 is an explanatory diagram serving to illustrate the mounting position and schematically illustrates the head 50. The mounting position of the bone conduction acoustic transmission device 10 may be a part via which the vibrations of the first magnetic body 110 are suitably transmitted to the auricle. For example, the adhesion position is preferably above the mastoid close to the auricle, which is an inconspicuous spot on the head 50 for continuous mounting where there is minimal muscle between the skin and the skull. Moreover, even when the first magnetic body 110 is provided in the auricle and the coil unit 150 is provided on the rear side of the auricle where the first magnetic body 110 is disposed and an acoustic signal is applied, the user is able to recognize sound.

(Bone Conduction Acoustic Transmission Device 10)

Figure 7:
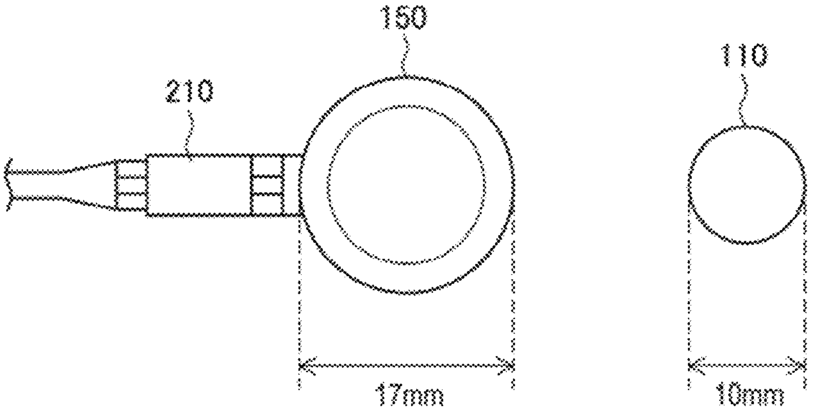
FIG. 7 is a cross-sectional view illustrating an example of a configuration of the bone conduction acoustic transmission device 10 according to the embodiment.
Figure 8:
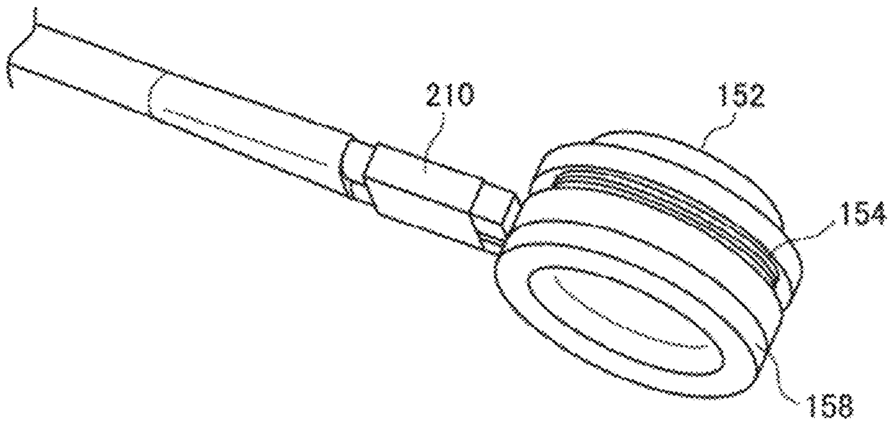
FIG. 8 is a cross-sectional view illustrating an example of a configuration of the bone conduction acoustic transmission device 10 according to the embodiment.

A concrete example of the bone conduction acoustic transmission device 10 according to the present embodiment will be described next with reference to FIGS. 7 and 8. The bone conduction acoustic transmission device 10 is connected by means of the wired connecting portion 210 to the acoustic signal output unit 20. The bone conduction acoustic transmission device 10 uses a neodymium magnet (of M50 strength) having a diameter of 10 mm, a height of 2 mm, and a mass of 0.2 g as the first magnetic body 110.

The coil unit 150 is dimensioned with a diameter of 17 mm and a height of 5 mm and has a mass of 2.6 g. The casing 152 was molded using a three-dimensional printer uPrint SE Plus (registered trademark) manufactured by Stratasys using fused deposition modeling (FDM (registered trademark)). For the coil 154, a coil with 110 turns of urethane-coated copper wire of a diameter of 0.2 mm was used. The second magnetic body 156 employs an iron core and was embedded in the casing 152 so as to be positioned in the center of the coil 154 (not illustrated in FIGS. 7 and 8). Silicone was used for the vibration damping member 158.

The coil unit 150 thus formed was connected to a digital amplifier used as the acoustic signal output unit 20 via the connecting portion 210. The resistance value of the coil 154 here was matched to the output characteristic of the acoustic signal output unit 20, and was 4.7Ω in this operating example.

Figure 9A:
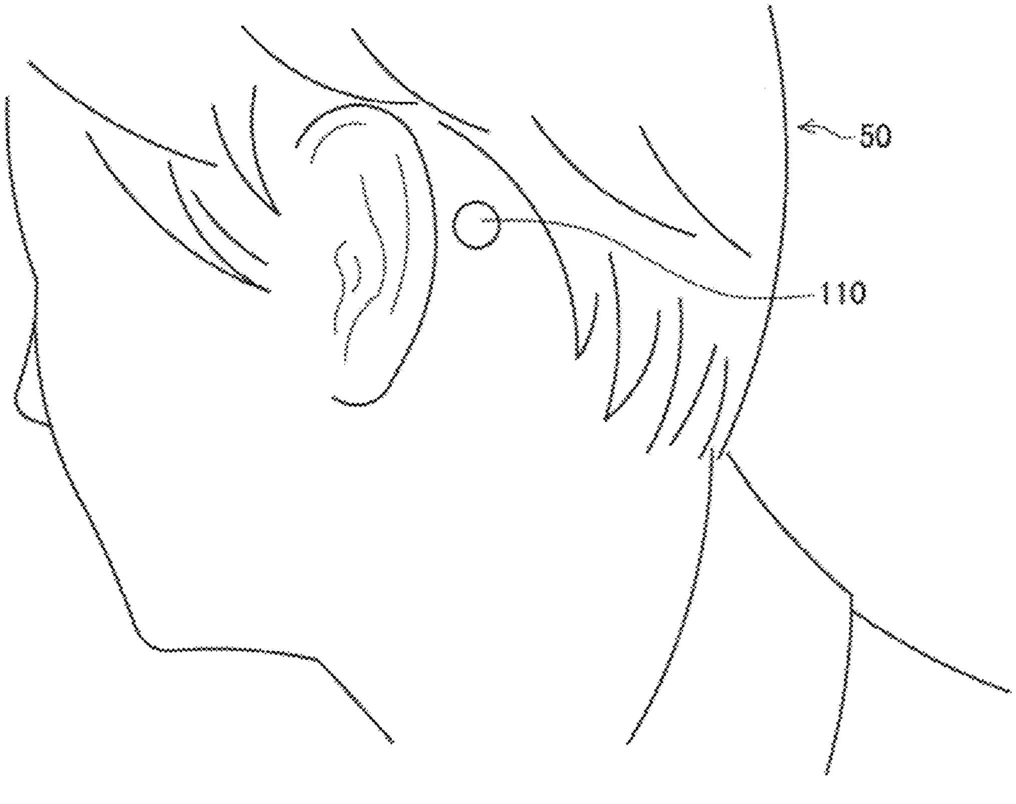
FIG. 9A is an explanatory diagram illustrating an example of an aspect in which the bone conduction acoustic transmission device 10 according to the embodiment is mounted.

Next, an aspect in which the bone conduction acoustic transmission device 10 is mounted is illustrated in FIGS. 9A, 9B, 9C, and 9D. FIG. 9A is a diagram illustrating the mounting position of the first magnetic body 110. As illustrated in FIG. 9A, using the rear side of the auricle as the mounting position of the first magnetic body 110 enables same to be mounted continuously without being conspicuous from the outside.

Figure 9B:
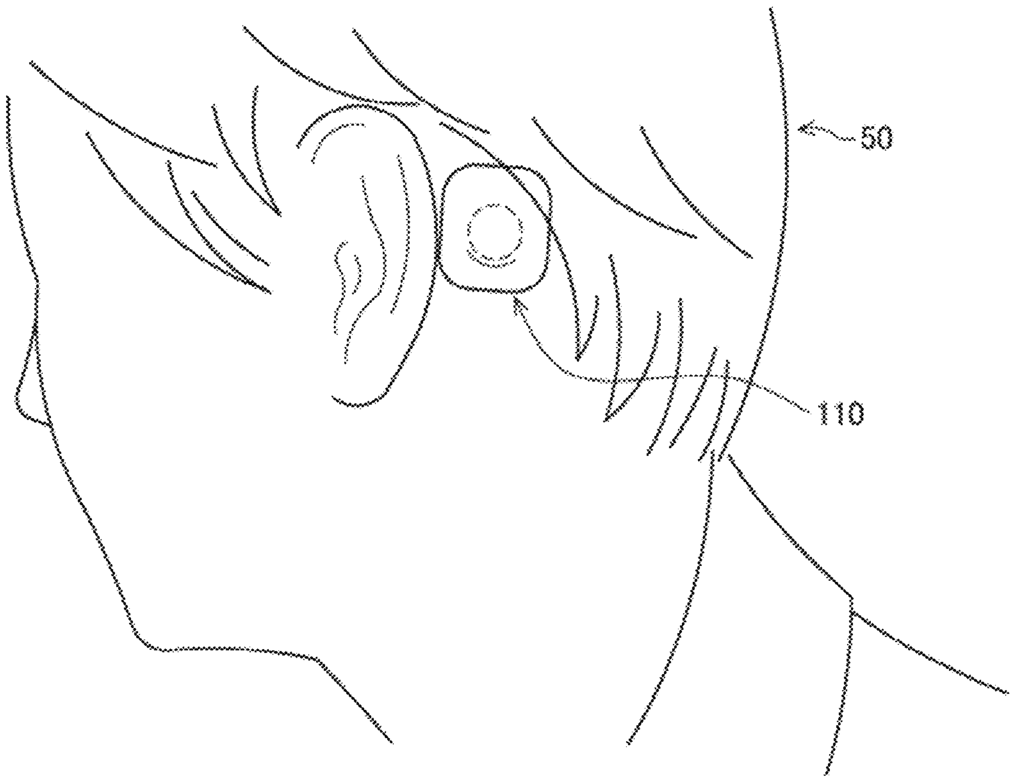
FIG. 9B is an explanatory diagram illustrating an example of an aspect in which the bone conduction acoustic transmission device 10 according to the embodiment is mounted.

FIG. 9B is an aspect in which the first magnetic body 110 is fixed to the head 50 using an adhesive bandage. A skin binder can also be used to mount the first magnetic body 110. By fixing the first magnetic body 110 in this manner, the user is able to go about their everyday life, including bathing and sleeping, without difficulty. Note that the act of sticking magnets to the human body is widely practiced for magnetic medical treatments and can be performed on the body safely.

Figure 9C:
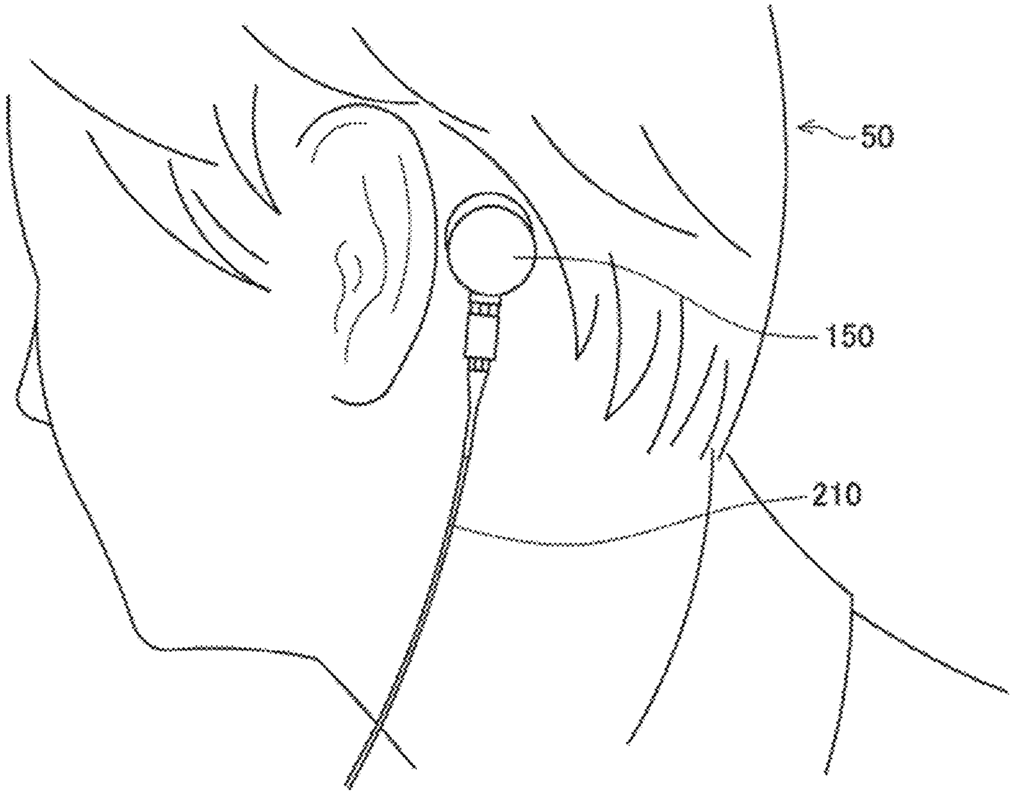
FIG. 9C is an explanatory diagram illustrating an example of an aspect in which the bone conduction acoustic transmission device 10 according to the embodiment is mounted.

Next, as illustrated in FIG. 9C, the coil unit 150 was mounted on the head 50. The coil unit 150 is mounted stably on the head 50 by means of the second magnetic body 156 (not illustrated), which is embedded in the center of the casing 152, and does not interfere with everyday life.

Figure 9D:
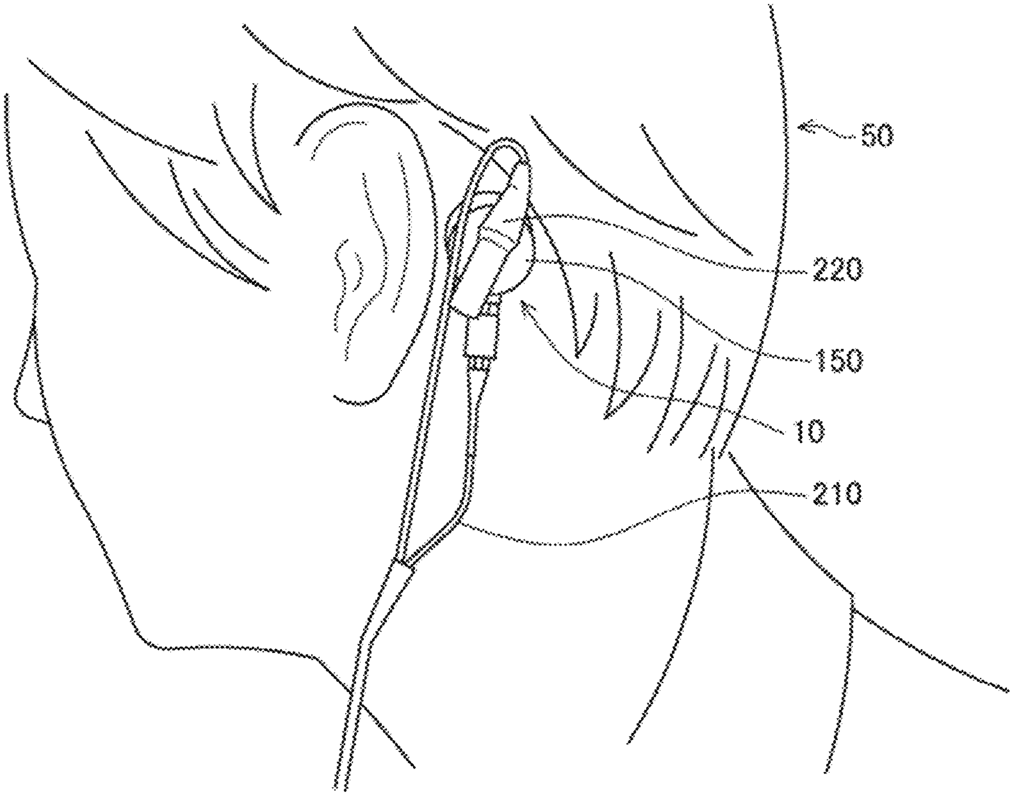
FIG. 9D is an explanatory diagram illustrating an example of an aspect in which the bone conduction acoustic transmission device 10 according to the embodiment is mounted.

Moreover, a microphone 220 can also be mounted on the coil unit 150, as illustrated in FIG. 9D. A sound interface can be used by using the mounted microphone 220. A dynamic-type microphone, a condenser-type microphone, a crystal-type microphone, a carbon-type microphone, or a bone conduction-type microphone, or the like, may be used as the microphone 220. Furthermore, in the bone conduction acoustic transmission device 10, in addition to the advantageous effect of sound leakage being suppressed, non-audible murmur (NAM) can be used by using a bone conduction-type microphone as the microphone 220.

(Comparison with Conventional Acoustic Transmission Device)

Next, Table 1 illustrates an example in which characteristics relating to usage via continuous mounting are qualitatively summarized for the bone conduction acoustic transmission device 10 according to the present embodiment and a conventional acoustic transmission device. Earphones (canal type), shoulder-mounted speakers, bone conduction devices, and bone-anchored hearing aids (BAHA) are illustrated as examples of conventional acoustic transmission devices. BAHA is bone conduction technology in which a titanium bolt is embedded in the skull and an external bone conduction unit is connected to the bolt to transmit vibrations. The characteristics of the respective devices each appear as a white circle when considered to be ideal and as a white triangle when considered relatively suitable. The determination criteria are as follows.

TABLE 1

| | EARPHONES (CANAL-TYPE) | SHOULDER-MOUNTED SPEAKERS | BONE CONDUCTION DEVICE | BAHA | PRESENT EMBODIMENT |
|---|---|---|---|---|---|
| CONSPICUOUSNESS | Δ | | | ○ | ○ |
| EARS FEEL FREE | | ○ | ○ | ○ | ○ |
| NO MOUNTING BURDEN | Δ | Δ | | ○ | ○ |
| PREVENT SOUND LEAKAGE | ○ | | | ○ | ○ |
| SURGERY NOT REQUIRED | ○ | ○ | ○ | | ○ |

Because conventional canal type earphones block the auricle, it is not necessarily enough to ensure natural hearing. Shoulder-mounted speakers are also being sold, but because sound leaks to the outside on account of their structure, same are not necessarily suited to being mounted continuously in spaces shared with other people. The bone conduction device has a typical headset-type structure, and a piezoelectric transducer is in continuous contact with the skin under a constant pressure, and therefore the burden of mounting the device such as the feeling of pressure is considerable, the outer tube is more conspicuous than that of canal type earphones, and the device is not necessarily suited to being mounted continuously. Moreover, because BAHA requires surgery, its application is limited to medical treatments for deafness, costs are high, and usage thereof is not straightforward for the typical user. On the other hand, with the bone conduction acoustic transmission device 10 according to the present embodiment, the coil unit 150 is mounted on the head 50 as a result of the magnetic force between the first magnetic body 110 and the second magnetic body 156, thus obviating the need for a fixing tool such as a headset or clip. In addition, the coil unit 150 does not possess a vibration-generating mechanism and has an extremely simple configuration. Thus, the bone conduction acoustic transmission device 10 according to the present embodiment is desirable in improving the problems confronted by conventional acoustic transmission devices in terms of features considered to be necessary for a device to be mounted continuously, and enables the likelihood of continuous mounting to be improved.

(Hearing Test Experiment)

To evaluate the performance of the bone conduction acoustic transmission device 10 prototyped as above, a hearing test experiment was conducted. Participants in the experiment underwent hearing tests under the following two conditions. The first condition was that the bone conduction acoustic transmission device 10 should be mounted on the back side of the auricle on the dominant ear side and that both ears should be plugged with earplugs (appears as "bone condition" hereinbelow). The second condition was that, in a comparative example, a canal type earphone should be mounted only on the dominant ear side and the ear on the opposite side should be plugged with an earplug (appears as the "phone condition" hereinbelow). Experiment participants recorded the minimum sound volume at which they could hear in response to respective frequencies by pressing a button. This hearing test experiment was conducted by means of a normal testing method in accordance with "Hearing Test Practice; Revised 4th Edition, 2017; Japanese Hearing Medical Institute, Minamiyama Temple". There were thirteen different frequencies from 15 Hz to 16000 Hz used in the tests, and a hearing test was first conducted with progressively lower frequencies starting at 1000 Hz, before conducting a hearing test with progressively higher frequencies starting at 2000 Hz. The experiment participants underwent tests two times each under the bone condition and the phone condition, respectively. There were six experiment participants, all of whom were male and aged from 24 to 39 years old.

Figure 10:
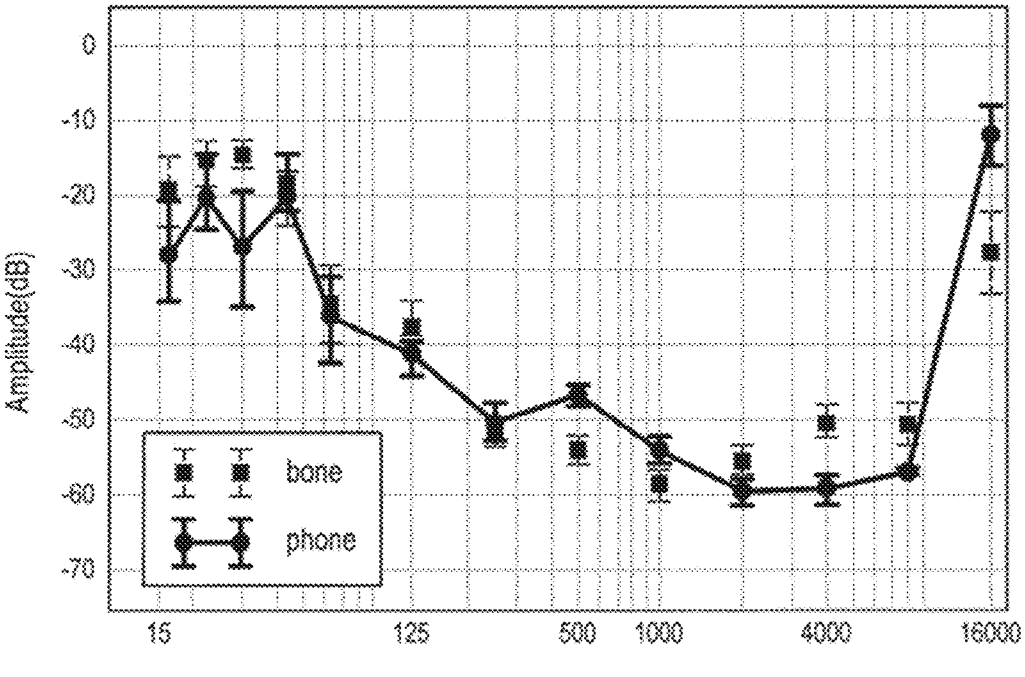
FIG. 10 is a graph illustrating hearing inspection results.

The results of the tests are illustrated in FIG. 10. FIG. 10 is a graph in which frequencies are displayed on the horizontal axis and hearing levels are displayed on the vertical axis, and on which the average values of the test results of the experiment participants have been plotted and the standard errors (SE) of the average values are denoted by error bars. As illustrated in FIG. 10, the test results under the bone condition and phone condition both represent similar behavior, and responses from experiment participants were obtained at hearing levels that were close at the respective frequencies. That is, the bone conduction acoustic transmission device 10 according to the present embodiment exhibits an adequate acoustic transmission performance even in comparison with ordinary hearing devices.

In addition, in this hearing test experiment, when frequencies were low, the vibrations of the first magnetic body 110 were recognized as physical vibrations rather than sounds. According to experiment results, in a low frequency band of 15 Hz to 44 Hz, there is an increase in standard errors under the phone condition. Furthermore, it was clear that two responses from the same person may have different values or sometimes there may be no response. On the other hand, standard errors in the low frequency band of 15 Hz to 44 Hz were small under the bone condition, and the difference in the values of two responses from the same person and the lack of response, as ascertained under the phone condition, did not occur. As a result, under the phone condition, experiment participants may be unable to recognize low frequency band vibrations as sound, and it may be assumed that the button might be pressed irrespective of whether sound is recognized. On the other hand, under the bone condition, there was no such misidentification of sound and the strength of the vibrations when low frequency vibrations were sensed as physical vibrations on the head 50 was more accurately responded to by the participants.

As per the foregoing results, the bone conduction acoustic transmission device 10 according to the present embodiment can be afforded a function for recognizing frequencies outside the hearing range in addition to frequencies within the hearing range. Hence, on account of this property, as a result of the user recognizing information not only as sound caused by bone vibrations, for example, but also physically recognizing vibrations, the user is able to recognize information even in an environment in which it is difficult to recognize sound due to external noise and so forth.

6. Modification Examples

First Modification Example

Figure 11:
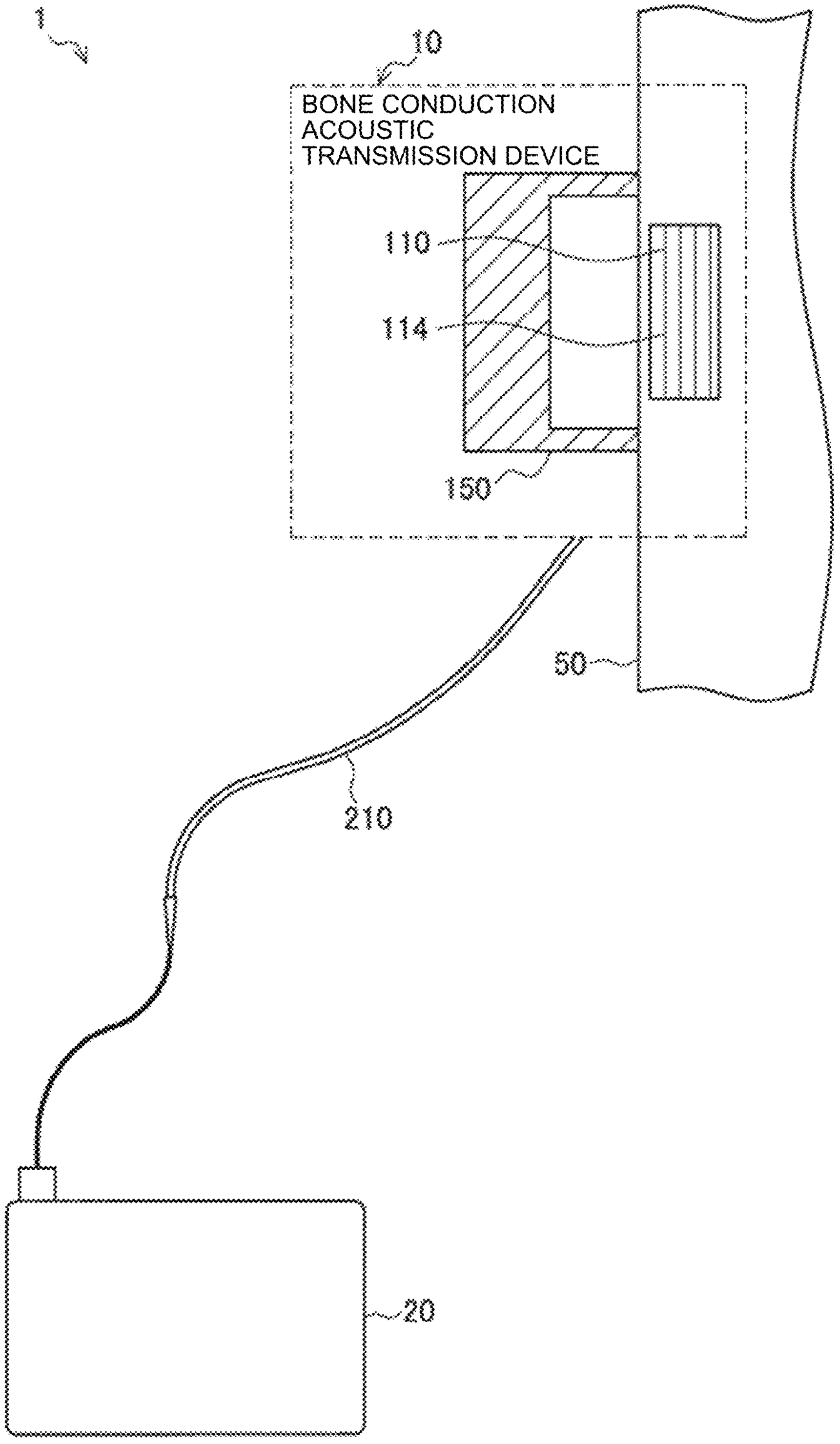
FIG. 11 is an explanatory diagram illustrating an example of a configuration of the bone conduction acoustic transmission device 10 according to the embodiment.

Although an example in which the first magnetic body 110 is placed in contact with the head 50 has been described in the foregoing embodiment, the first magnetic body 110 may be embedded in the head 50 as illustrated in FIG. 11. FIG. 11 is an explanatory diagram illustrating an example in which the bone conduction acoustic transmission device 10 is used such that the first magnetic body 110 is embedded in the head 50. An acoustic signal that has been output by the acoustic signal output unit 20 is transmitted to the coil unit 150 via the connecting portion 210, and the first magnetic body 110 vibrates due to the magnetic field variation thus generated. There are no particular limitations on the method for embedding the first magnetic body 110 in the head 50 or on the embedding position, as long as the first magnetic body 110 vibrates according to the variations in the magnetic field produced when an acoustic signal is applied to the coil unit 150 and the embedding allows the vibrations to be transmitted to the inner ear. Furthermore, the periphery of the first magnetic body 110 may be coated with a material 114 that does not interfere immunologically with the living body. Note that the height h1 of the vibration damping member 158 when the first magnetic body 110 is embedded in the head 50 need not be greater than the height h2 of the first magnetic body 110 when the first magnetic body 110 is embedded in the head 50.

Second Modification Example

By fitting the bone conduction acoustic transmission device 10 simultaneously above the mastoid located on the left and right sides of the head 50, respectively, as illustrated in FIG. 6, listening is divided between sounds emitted by the left and right bone conduction acoustic transmission devices 10, enabling the user to sense the localization of acoustic images using stereo sound. Using the present technology, it is considered possible, even with a bone conduction device, to divide listening between left and right sounds due to the different distances from the respective bone conduction acoustic transmission devices 10 to the left and right inner ears. In other words, the bone conduction acoustic transmission device 10 disposed on the right side of the head 50 is thought to stimulate the inner ear on the right side more than the bone conduction acoustic transmission device 10 disposed on the left side of the head.

As mentioned earlier, the user is able to use a plurality of the bone conduction acoustic transmission device 10 according to requirements, and may mount one bone conduction acoustic transmission device 10 in the vicinity of another bone conduction acoustic transmission device 10. Thereupon, the vibration damping member 158 and part of the casing 152 may be configured from a material that blocks magnetic fields so that the magnetic bodies of the respective bone conduction acoustic transmission devices 10 do not affect the other bone conduction acoustic transmission device 10. With such a configuration, it is possible to prevent a bone conduction acoustic transmission device 10 from operating erroneously under the influence of the magnetic field generated by the other bone conduction acoustic transmission device 10, and a plurality of the bone conduction acoustic transmission device 10 can be mounted without being affected by the magnetic body of the other bone conduction acoustic transmission device 10.

By affording the bone conduction acoustic transmission device 10 the foregoing configuration and arranging a plurality thereof on the head 50, acoustic information for localization in a space can be presented like audio icons.

Third Modification Example

Figure 12:
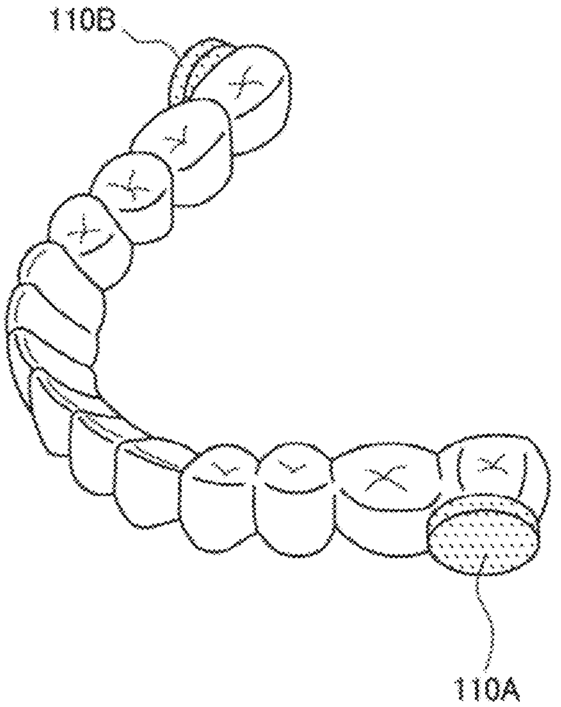
FIG. 12 is an explanatory diagram serving to illustrate an example of a position for mounting the bone conduction acoustic transmission device 10 according to the embodiment.

The bone conduction acoustic transmission device 10 may be mounted not only on the head 50 but also intraorally such as in a tooth or mouthpiece or mounted on another part such as the jaw. For example, it was confirmed that when an orthodontic mouthpiece, like that illustrated in FIG. 12 and in which neodymium magnets are made to adhere as first magnetic bodies 110A and 110B, is mounted on the teeth and when excitation via the coil unit 150 attached to the cheeks is attempted, sound can be transmitted to the inner ear. When this kind of bone conduction acoustic transmission device 10 is used intraorally, same can also be applied to dentures and the first magnetic body 110 can be embedded inside dentures. The coil unit 150 may be configured for acoustic signal inputs by being equipped with a power supply device and a wireless communication device, may be formed so as to be suited to an intraoral environment by encapsulating the coil 154 inside the casing 152, for instance, and may be mounted on the outside of dentures. By applying the bone conduction acoustic transmission device 10 to teeth, the vibrations of the first magnetic body 110 can be transmitted directly to the skull without undergoing damping by the skin.

Fourth Modification Example

The present invention may also be applied to other tactile interface devices. Like bone conduction devices, it is important that tactile interfaces make appropriate contact with the body such as the skin in order to be used effectively. However, current tactile interfaces frequently lack appropriate contact with the body, and consequently there are often limits on the usefulness of tactile interfaces at present. On the other hand, the present technology employs compact magnets as the first magnetic body 110 and makes it easy to suitably arrange the compact magnets on the body, thereby broadening the implementation of magnetic medical treatments and so forth. By separating the compact magnet from the device main body, it is possible to configure a tactile interface of superior mountability.

Figure 13:
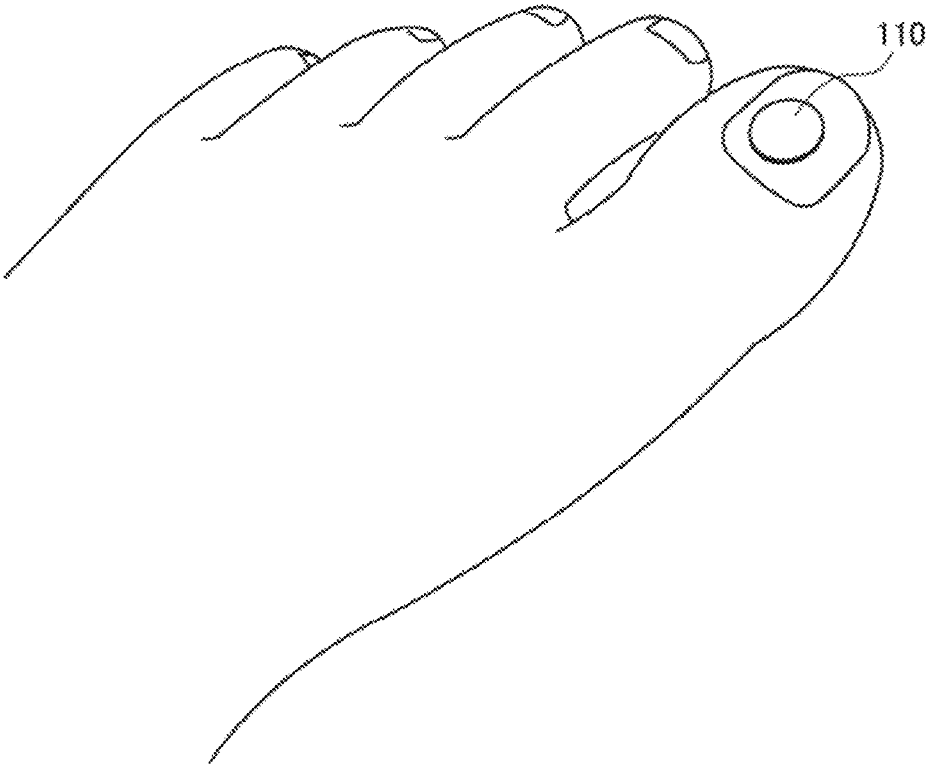
FIG. 13 is an explanatory diagram serving to illustrate an example of a position for mounting the bone conduction acoustic transmission device 10 according to the embodiment.

Hence, the bone conduction acoustic transmission device 10 may be disposed in positions where vibrations cannot be transmitted to the inner ear. FIG. 13 is an example in which the first magnetic body 110 is disposed on a toenail. The bone conduction acoustic transmission device 10 is capable of transmitting vibrations at frequencies outside the hearing range and therefore the user is able to physically recognize such vibrations. For example, by disposing the first magnetic body 110 on a toenail and providing the coil unit 150 in a shoe, a smart shoe with a tactile interface can be configured even without a mechanism such as a vibration motor. Thus, this technique can also be applied to other tactile interface devices, and by mounting a plurality of bone conduction acoustic transmission devices 10 on the body, the user is then able to grasp spatial information such as directions.

The present technology is related to many tactile interfaces in terms of arranging a piezoelectric transducer on the body such as the skin and, as described earlier, the present invention can also be utilized as a tactile interface device. In addition, because the bone conduction acoustic transmission device 10 of the present invention is capable of transmitting sound information, same is capable of expression that differs greatly from an ordinary vibration interface. For example, NailTactors, which are one such vibration interface, are provided with a plurality of piezoelectric transducers arranged on the surface of a nail so that symbols may be transmitted according to vibration sequences. Such NailTactors enable ten kinds of symbols to be transmitted as information at a frequency of one per second. In addition, a lot of experiments in which symbols are transmitted to the skin by means of a vibration interface are being conducted. However, for the moment, we have reached the point where the task of selecting one symbol from among nine kinds of symbol is realized every few seconds, and the problem of implementation as an information interface still remains. On the other hand, in comparison with such devices, the present technology is far more efficient for the transmission of information using sound, also permits high recognition accuracy, and can be used as an information interface.

7. Applied Example

The present technology enables a sound interface to be always available in everyday life. Furthermore, by using an interactive assistant or the like in conjunction with the present technology, the user is always connected to a computer and is able to receive support. With an ordinary mobile phone or smartwatch, the device needs to be taken out and necessitates a wristwatch operation or similar in order to be used, but by applying the present technology, operations can be implemented as is, without interrupting everyday life or work, by means of a sound interface, and a so-called always-connected human being is thus born. Although a research area known as audio-augmented reality exists, because same is premised on using headphones or the like, applications of audio-augmented reality are limited to augmenting museum appreciation and experiences, and so forth. The present invention may be applied to such audio-augmented reality.

In addition, the present invention can also be used for support using nonverbal sound information such as sports training via voice feedback or so-called cybernetics training.

The present invention enables improvements to a culinary experience via acoustics. For example, although it is known that a culinary experience is changed by supplying mastication sounds, eating a meal while mounting canal type earphones or headphones, for example, is not necessarily comfortable. Because the user is able to use the present technology comfortably, their eating experience can be improved via acoustics by means of the present technology.

As means for presenting spatial information such as directions by means of piezoelectric transducers mounted on the body, there exist mounting-type devices such as an Active Belt with which a piezoelectric transducer is disposed on a belt wrapped around the waist, or a versatile extra-sensory transducer (VEST) with which a vest-type piezoelectric transducer array is mounted. The present invention provides the possibility of spatial presentation by arranging a plurality of the bone conduction acoustic transmission devices 10 on the surface of the body.

Preferred embodiments of the present invention have been described in detail hereinabove with reference to the accompanying drawings, but the technical scope of the present invention is not limited to or by such an example. It is obvious that a person with normal knowledge in the technical field of the present invention could arrive at various modification examples or revised examples within the scope of the technological ideas disclosed in the claims, and it is naturally understood that such examples belong to the technical scope of the present invention.

Furthermore, the advantageous effects disclosed in the present specification are only descriptive or exemplary, and non-limiting. In other words, the technology according to the present invention affords, in addition to or instead of the foregoing advantageous effects, other advantageous effects which are obvious, from the disclosure of the present specification, to a person skilled in the art.

Note that the following configurations also fall within the technical scope of the present invention.

(1)

A bone conduction acoustic transmission device, comprising:

- a first magnetic body placed in contact with or embedded in the head of a living body beforehand; and
- a coil unit provided separately from the first magnetic body,
- wherein the coil unit has
- a coil configured using a predetermined casing that can be mounted on the first magnetic body and
- a second magnetic body which is provided in a predetermined position of the casing and does not vibrate due to the coil, and
- wherein the first magnetic body vibrates as a result of applying an acoustic signal to the coil with the coil unit mounted on the head.

(2)

The bone conduction acoustic transmission device as claimed in (1), wherein, as a result of magnetic interaction between the first magnetic body and the second magnetic body, the positional relationship between the first magnetic body and the coil unit is fixed.

(3)

The bone conduction acoustic transmission device as claimed in (1) or (2), wherein, when the coil unit is mounted on the head, the second magnetic body is provided in a position inside the magnetic field of the first magnetic body.

(4)

The bone conduction acoustic transmission device as claimed in any one of (1) to (3), further comprising:

- a vibration damping member which is provided protrudingly from a bottom surface of the casing on the side opposite the head so as to enclose the sides of the first magnetic body when mounted on part of the living body,
- wherein the height at which the vibration damping member protrudes from the bottom surface is higher than the height of the first magnetic body.

(5)

The bone conduction acoustic transmission device as claimed in (4), wherein the vibration damping member is formed using a material that blocks a magnetic field of the first magnetic body.

(6)

The bone conduction acoustic transmission device as claimed in any one of (1) to (5), wherein the number of windings of the coil is adjusted to establish an impedance match with an output source of the applied acoustic signal.

(7)

The bone conduction acoustic transmission device as claimed in any one of (1) to (6), wherein the first magnetic body is machined to ensure breathability for the skin.

(8)

The bone conduction acoustic transmission device as claimed in any one of (1) to (7), wherein the first magnetic body is detachably placed in contact with the head via a material capable of adhering to the skin.

(9)

The bone conduction acoustic transmission device as claimed in any one of (1) to (7), wherein the first magnetic body is detachably placed in contact with the head by means of an adhesive body provided so as to cover the first magnetic body.

(10)

The bone conduction acoustic transmission device as claimed in any one of (1) to (7), wherein the first magnetic body is embedded in the living body with the periphery thereof coated with a material that does not interfere immunologically with the living body.

(11)

The bone conduction acoustic transmission device as claimed in any one of (1) to (10), wherein the first magnetic body is a neodymium magnet.

REFERENCE SIGNS LIST

1 BONE CONDUCTION ACOUSTIC TRANSMISSION SYSTEM
10 BONE CONDUCTION ACOUSTIC TRANSMISSION DEVICE
20 ACOUSTIC SIGNAL OUTPUT UNIT
50 HEAD
110 FIRST MAGNETIC BODY
150 COIL UNIT
152 CASING
154 COIL
156 SECOND MAGNETIC BODY
158 VIBRATION DAMPING MEMBER

The invention claimed is:

1. A bone conduction acoustic transmission device, comprising:

- a first magnetic body placeable to be in contact with or embeddable in a head of a living body;
- a coil unit separate from the first magnetic body, wherein the coil unit includes:
  - a casing mountable on the first magnetic body;
  - a coil wound around the casing; and
  - a second magnetic body inside the casing, wherein the second magnetic body is configured not to vibrate due to the coil, and
  - the first magnetic body is configured to vibrate based on an acoustic signal applied to the coil with the coil unit mounted on the head; and
- a vibration damping member that protrudes from a bottom surface of the casing, wherein
  - the bottom surface of the casing is on a side opposite the head,
  - the vibration damping member is configured to enclose sides of the first magnetic body with the coil unit is mounted on the head, and
  - a height at which the vibration damping member protrudes from the bottom surface is higher than a height of the first magnetic body.

2. The bone conduction acoustic transmission device as claimed in claim 1, wherein, based on a magnetic interaction between the first magnetic body and the second magnetic body, a positional relationship between the first magnetic body and the coil unit is fixed.

3. The bone conduction acoustic transmission device as claimed in claim 1, wherein, with the coil unit mounted on the head, the second magnetic body is in a position inside a magnetic field of the first magnetic body.

4. The bone conduction acoustic transmission device as claimed in claim 1, wherein the vibration damping member is of a material that blocks a magnetic field of the first magnetic body.

5. The bone conduction acoustic transmission device as claimed in claim 1, wherein a number of windings of the coil is adjustable to establish an impedance match with an output source of the acoustic signal applied to the coil.

6. The bone conduction acoustic transmission device as claimed in claim 1, wherein the first magnetic body is machined to ensure breathability for skin of the living body.

7. The bone conduction acoustic transmission device as claimed in claim 1, wherein the first magnetic body is detachably placeable to be in contact with the head via a material adherable to skin of the living body.

8. The bone conduction acoustic transmission device as claimed in claim 1, wherein the first magnetic body is detachably placeable to be in contact with the head via an adhesive body that covers the first magnetic body.

9. The bone conduction acoustic transmission device as claimed in claim 1, wherein the first magnetic body is embeddable in the living body, and a periphery of the first magnetic body is coated with a material that does not interfere immunologically with the living body.

10. The bone conduction acoustic transmission device as claimed in claim 1, wherein the first magnetic body is a neodymium magnet.

* * * * *